US008749185B2

(12) United States Patent
Lee et al.

(10) Patent No.: US 8,749,185 B2
(45) Date of Patent: Jun. 10, 2014

(54) VENTILATION APPARATUS WITH FEEDBACK COMPENSATION CONTROL AND METHOD FOR OPERATING THE SAME

(75) Inventors: Yi-Hua Lee, Taoyuan Shien (TW); Yueh-Shan Lin, Taoyuan Shien (TW); Yan-Lin Chen, Taoyuan Shien (TW); Chih-Hua Lin, Taoyuan Shien (TW); Te-Chung Liu, Taoyuan Shien (TW)

(73) Assignee: Delta Electronics, Inc., Taoyuan County (TW)

(*) Notice: Subject to any disclaimer, the term of this patent is extended or adjusted under 35 U.S.C. 154(b) by 302 days.

(21) Appl. No.: 13/250,273

(22) Filed: Sep. 30, 2011

(65) Prior Publication Data

US 2012/0299525 A1    Nov. 29, 2012

(30) Foreign Application Priority Data

May 23, 2011 (TW) .............................. 100117883 A

(51) Int. Cl.
*H02P 27/00* (2006.01)
(52) U.S. Cl.
USPC .................. 318/400.3; 318/400.2; 318/400.23
(58) Field of Classification Search
USPC ......... 318/400.3, 400.2, 400.23, 400.01, 721, 318/439, 798, 801, 802, 803
See application file for complete search history.

(56) References Cited

U.S. PATENT DOCUMENTS

| 6,462,494 | B1 | 10/2002 | Schone et al. |
| 2007/0044756 | A1 | 3/2007 | Kuo et al. |
| 2008/0152325 | A1* | 6/2008 | Bae et al. ...................... 388/811 |
| 2009/0104034 | A1 | 4/2009 | Takada |
| 2009/0134823 | A1 | 5/2009 | Jeung |

FOREIGN PATENT DOCUMENTS

TW    I301355    9/2008

* cited by examiner

*Primary Examiner* — Karen Masih
(74) *Attorney, Agent, or Firm* — Muncy, Geissler, Olds & Lowe, P.C.

(57) ABSTRACT

A ventilation apparatus with a two-section feedback compensation control and a method for operating the same are disclosed. The ventilation apparatus includes a power conversion unit, a driven circuit, a DC motor, a current-sensing unit, a voltage compensation unit, and a control unit. The power conversion unit receives and converts an AC power voltage into a DC power voltage. The driven circuit receives the DC power voltage and outputs a driven voltage. The DC motor is driven through the driven voltage. The current-sensing unit senses an output current of the DC motor. The control unit receives the output current to compare to a threshold current value, thus controlling the voltage compensation unit. Accordingly, the DC power voltage is adjusted to adjust the speed of the DC motor.

20 Claims, 7 Drawing Sheets

VENTILATION APPARATUS WITH FEEDBACK COMPENSATION CONTROL AND METHOD FOR OPERATING THE SAME

BACKGROUND OF THE INVENTION

1. Field of the Invention

The present invention relates generally to a ventilation apparatus and a method for operating the same, and more particularly to a ventilation apparatus with feedback compensation control and a method for operating the same.

2. Description of Prior Art

A traditional home ventilation apparatus, such as an air interchanging fan, is usually involved a shaded-pole motor or a capacitor motor. Also, operation efficiency of the shaded-pole or capacitor ventilation apparatus is typically about 0.8 CFM/Watt to 5.0 CFM/Watt. Because the request of operation efficiency for Energy Star in US has to up to 2.8 CMF/Watt, a brushless DC motor (BLDCM) is now used most widely in the home ventilation apparatus.

BLDCM has the advantages, such as simple structure, ruggedness, free maintains, and small size, as well as the properties are similar to the DC motor. In addition, BLDCM is driven without exciting current because the rotor thereof is composed of permanent magnetic material to produce lower rotation inertia. Accordingly, BLDCMs are widely applied in precision machineries, automatic control applications, consumer electronics, and computer peripherals.

Although BLDCMs are used to significantly improve operation efficiency up to 6 CFM/Watt to 12 CFM/Watt, the maximum air flow thereof is reduced. Even if the air flow is increased, power consumption of the ventilation apparatus is correspondingly increased. Both the above-mentioned conditions can not conform to the requests for Energy Star in US.

Reference is made to FIG. 1 which is a circuit diagram of a prior art ventilation apparatus. The ventilation apparatus includes a power conversion unit 10A, a driven circuit 20A, a DC motor 30A, a current-sensing unit 40A, and a microcontroller 50A. The power conversion unit 10A receives an AC power voltage Vac and converts the AC power voltage Vac into a DC power voltage Vo. The power conversion unit 10A includes an electromagnetic interference filter 102A, a rectifier 104A, a pulse-width modulation integrated circuit (PWM IC) 106A, a DC converter 108A, a filter 110A, an optical coupler 112A, and an error amplifier 114A.

The electromagnetic interference filter 102A receives the AC power voltage Vac to eliminate noise of the AC power voltage Vac. The rectifier 104A is electrically connected to the electromagnetic interference filter 102A to rectify the filtered AC power voltage Vac and output a DC output voltage (not shown). The DC converter 108A is electrically connected to the rectifier 104 to receive the DC output voltage and convert energy provided from the AC power voltage Vac to a dc-side load. The filter 110A is electrically connected to the DC converter 108A to filter the DC voltage and produce the DC power voltage Vo. The PWM IC 106A is electrically connected to the rectifier 104A and the DC converter 108A to output a PWM signal and control power switches (not shown) of the DC converter 108A, thus providing an energy conversion between an input side and an output side of the power conversion unit 10A. The optical coupler 112A is electrically connected to the PWM IC 106A to provide signal isolation between the input side and the output side of the power conversion unit 10A. The error amplifier 114A is electrically connected to the optical coupler 112A to receive the DC power voltage Vo. The DC power voltage Vo is divided through the first resistor R1$a$, the second resistor R2$a$ to obtain a divided voltage. The divided voltage is compared to a reference voltage V1 to produce an error amplifier signal (not shown) and the error amplifier signal is sent to the PWM IC 106A by the optical coupler 112A, thus controlling the DC converter 108A.

The driven circuit 20A is electrically connected to the power conversion unit 10A to receive the DC power voltage Vo and output a driven voltage (not shown), thus driving the DC motor 30A. The DC motor 30A is electrically connected to the driven circuit 20A and driven by the driven voltage outputted from the driven circuit 20A. In particular, the DC motor 30A is a brushless DC motor, BLDCM. The current-sensing unit 40A is electrically connected to driven circuit 20A and the DC motor 30A to sense an output current (not shown) outputted from the DC motor 30A. The microcontroller 50A is electrically connected to the current-sensing unit 40A and the driven circuit 20A to receive the output current and the DC power voltage Vo, thus controlling the driven circuit 20A to drive the DC motor 30A.

For controlling the ventilation apparatus by using voltage-dividing resistors, due to $$Vo = V1 \times \frac{R1a + R2a}{R2a}$$

Hence, the DC power voltage Vo is fixed when the first resistor R1$a$ and the second resistor R2$a$ are fixed, and the DC power voltage Vo is equal to $$Vo = V1 \times \frac{R1a + R2a}{R2a}$$

Reference is made to FIG. 2 which is a curve chart of air pressure and air flow of the prior art ventilation apparatus. FIG. 2 shows a first curve Cv1 (low-pressure and low-speed curve) and a second curve Cv2 (high-pressure and high-speed curve). When the ventilation apparatus is operated under the low-level DC power voltage Vo, the curve chart of air pressure and air flow of the ventilation apparatus is shown as the first curve Cv1. Similarly, the curve chart of air pressure and air flow of the ventilation apparatus is shown as the second curve Cv2 when the ventilation apparatus is operated under the high-level DC power voltage Vo.

Requests of power consumption and air flow for the ventilation apparatus are regulated by Energy Star in US as follows:

1. The energy efficiency needs to exceed 2.8 CFM/Watt based on 0.1 inch-H2O and 80 CFM; and
2. A ratio between air flow based on 0.25 inch-H2O and that based on 0.1 inch-H2O needs to exceed 60%.

When the ventilation apparatus is operated along the first curve Cv1, the first request (energy efficiency) can be achieved. However, the second request cannot be achieved because a ratio between air flow based on 0.25 inch-H2O and that based on 0.1 inch-H2O is only 25% ($^{20}/_{80}$=25%) which is calculated by a first operation point Ps1 and a second operation point Ps2. Furthermore, the second request (air flow ratio which is calculated by a third operation point Ps3 and a fourth operation point Ps4) can be achieved when the ventilation apparatus is operated along the second curve CV2. However, the first request cannot be achieved because the air flow exceeds 80 CFM.

Hence, the ventilation apparatus is operated by only using voltage-dividing resistors cannot conform to the requests of Energy Star in US.

Accordingly, it is desirable to provide a ventilation apparatus with a feedback compensation control and a method for operating the same. The DC power voltage is compensated and regulated by a voltage compensation unit to conform to requests of power consumption and air flow for the ventilation apparatus.

SUMMARY OF THE INVENTION

An object of the invention is to provide a ventilation apparatus with a feedback compensation control to solve the above-mentioned problems.

The ventilation apparatus with a two-section feedback compensation control and the ventilation apparatus includes a power conversion unit, a driven circuit, a DC motor, a current-sensing unit, a voltage compensation unit, and a control unit.

The power conversion unit receives an AC power voltage and converts the AC power voltage into a DC power voltage. The driven circuit is electrically connected to the power conversion unit to receive the DC power voltage and output a driven voltage. The DC motor is electrically connected to the driven circuit and driven by the driven voltage outputted from the driven circuit. The current-sensing unit is electrically connected to driven circuit and the DC motor to sense an output current outputted from the DC motor. The voltage compensation unit is electrically connected to the power conversion unit. The control unit is electrically connected to the current-sensing unit, the driven circuit, and the voltage compensation unit to receive the output current and produce a threshold current value comparing to the output current.

When the output current is smaller than the threshold current value, the control unit is configured to produce a DC control signal to control the voltage compensation unit regulating the DC power voltage, thus adjusting speed of the DC motor through the driven circuit.

Another object of the invention is to provide a ventilation apparatus with a feedback compensation control to solve the above-mentioned problems.

The ventilation apparatus with a multi-section feedback compensation control and the ventilation apparatus includes a power conversion unit, a driven circuit, a DC motor, a current-sensing unit, a voltage compensation unit, and a control unit.

The power conversion unit receives an AC power voltage and converts the AC power voltage into a DC power voltage. The driven circuit is electrically connected to the power conversion unit to receive the DC power voltage and output a driven voltage. The DC motor is electrically connected to the driven circuit and driven by the driven voltage outputted from the driven circuit. The current-sensing unit is electrically connected to driven circuit and the DC motor to sense an output current outputted from the DC motor. The voltage compensation unit is electrically connected to the power conversion unit. The control unit is electrically connected to the current-sensing unit, the driven circuit, and the voltage compensation unit to receive the output current and produce a plurality of threshold current values comparing to the output current.

The control unit is configured to produce a pulse-width modulation control signal or a digital control signal to control the voltage compensation unit regulating the DC power voltage, thus adjusting speed of the DC motor through the driven circuit according to each threshold current value comparing to the output current.

Another object of the invention is to provide a method for operating a ventilation apparatus to solve the above-mentioned problems.

The method is provided to operate the ventilation apparatus with a two-section or a multi-section feedback compensation control and the method includes the following steps: First, a power conversion unit is provided to receive an AC power source and convert the AC power voltage into a DC power voltage. Afterward, a driven circuit is provided to receive the DC power voltage and output a driven voltage to drive a DC motor. Afterward, a current-sensing unit is provided to sense an output current outputted from the DC motor. Afterward, a voltage compensation unit is provided. Finally, a control unit is provided to receive the output current and compare the output current to a threshold current value, thus regulating the DC power voltage by controlling the voltage compensation unit and adjusting speed of the DC motor by the driven circuit.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
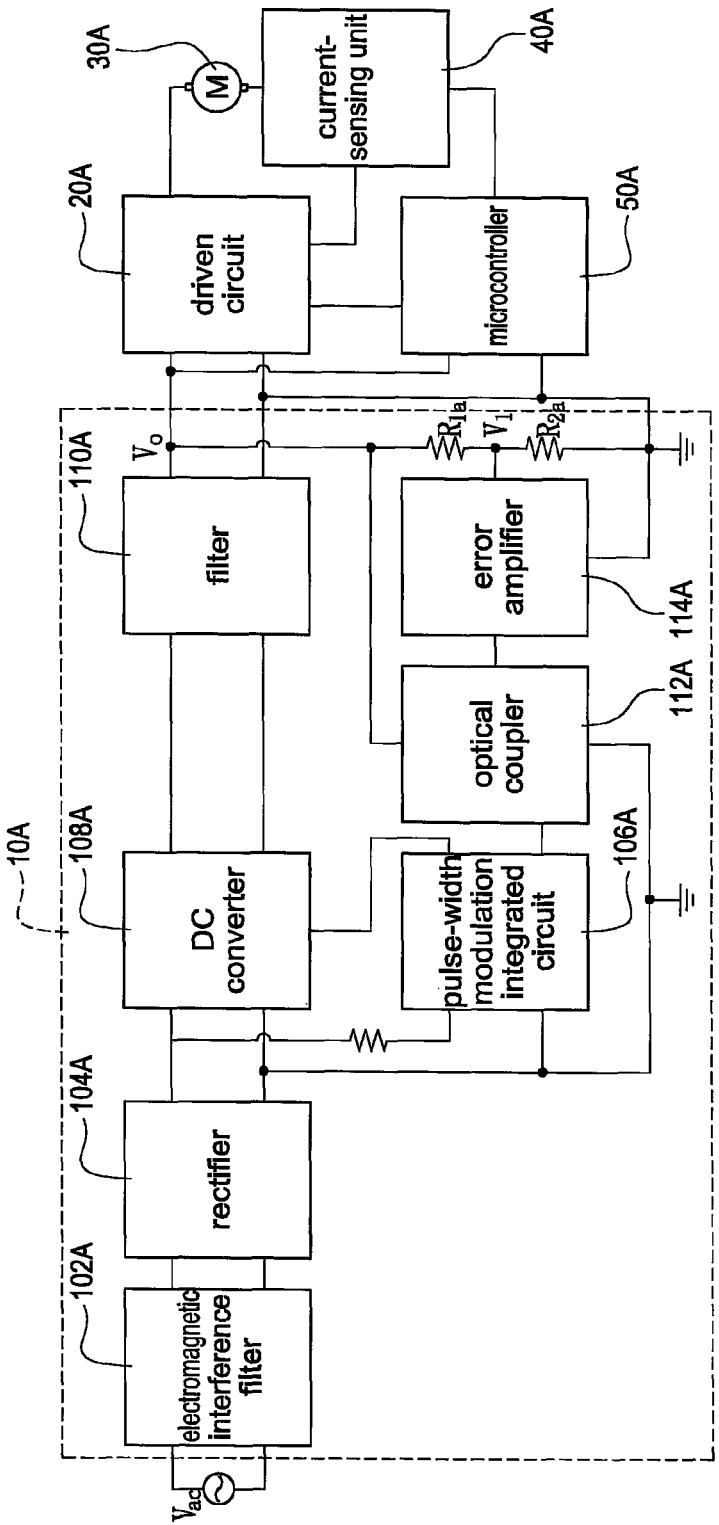
FIG. 1 is a circuit diagram of a prior art ventilation apparatus.
Figure 2:
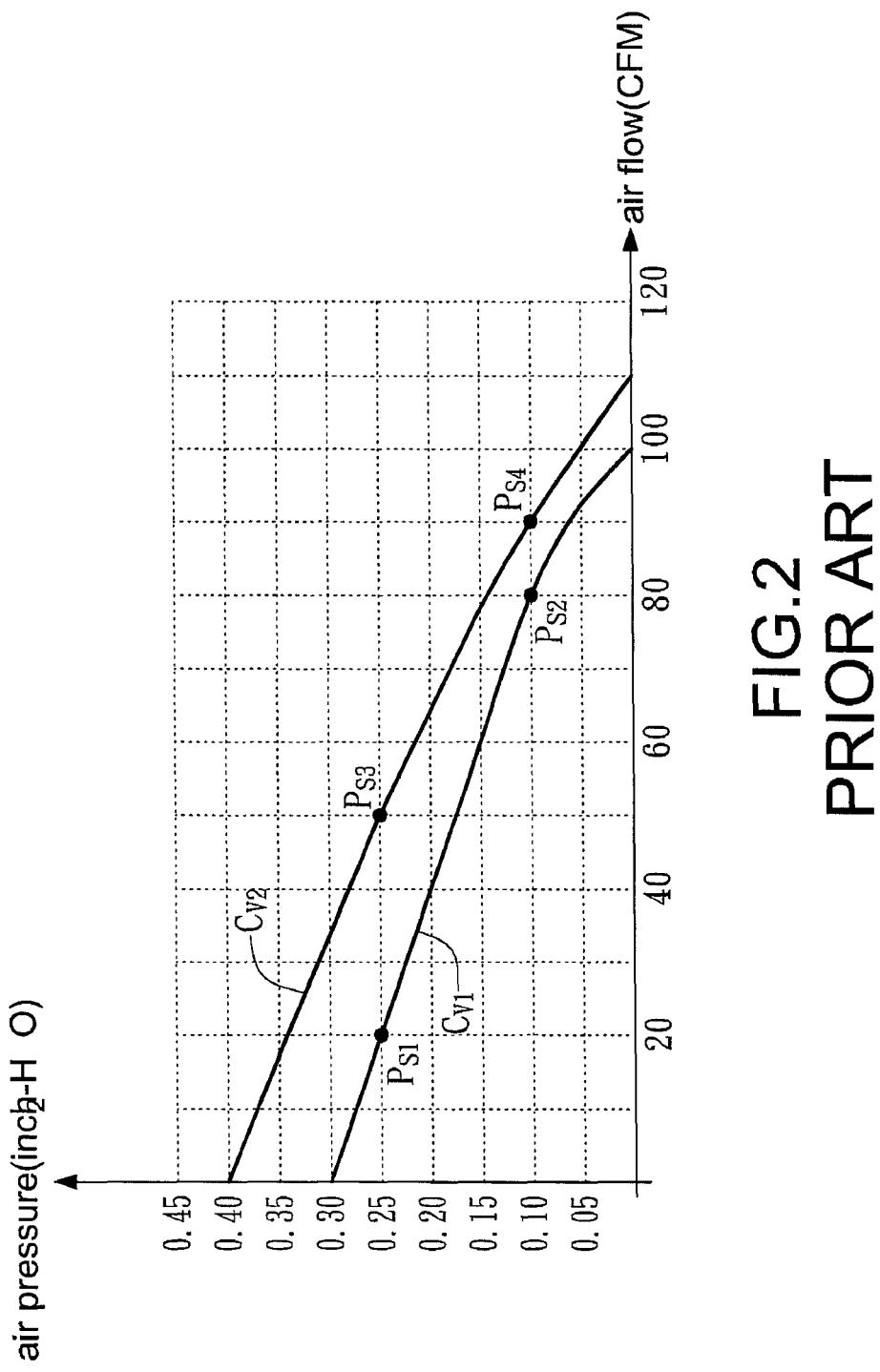
FIG. 2 is a curve chart of air pressure and air flow of the prior art ventilation apparatus.

Reference will now be made to the drawing figures to describe the present invention in detail.

Figure 3:
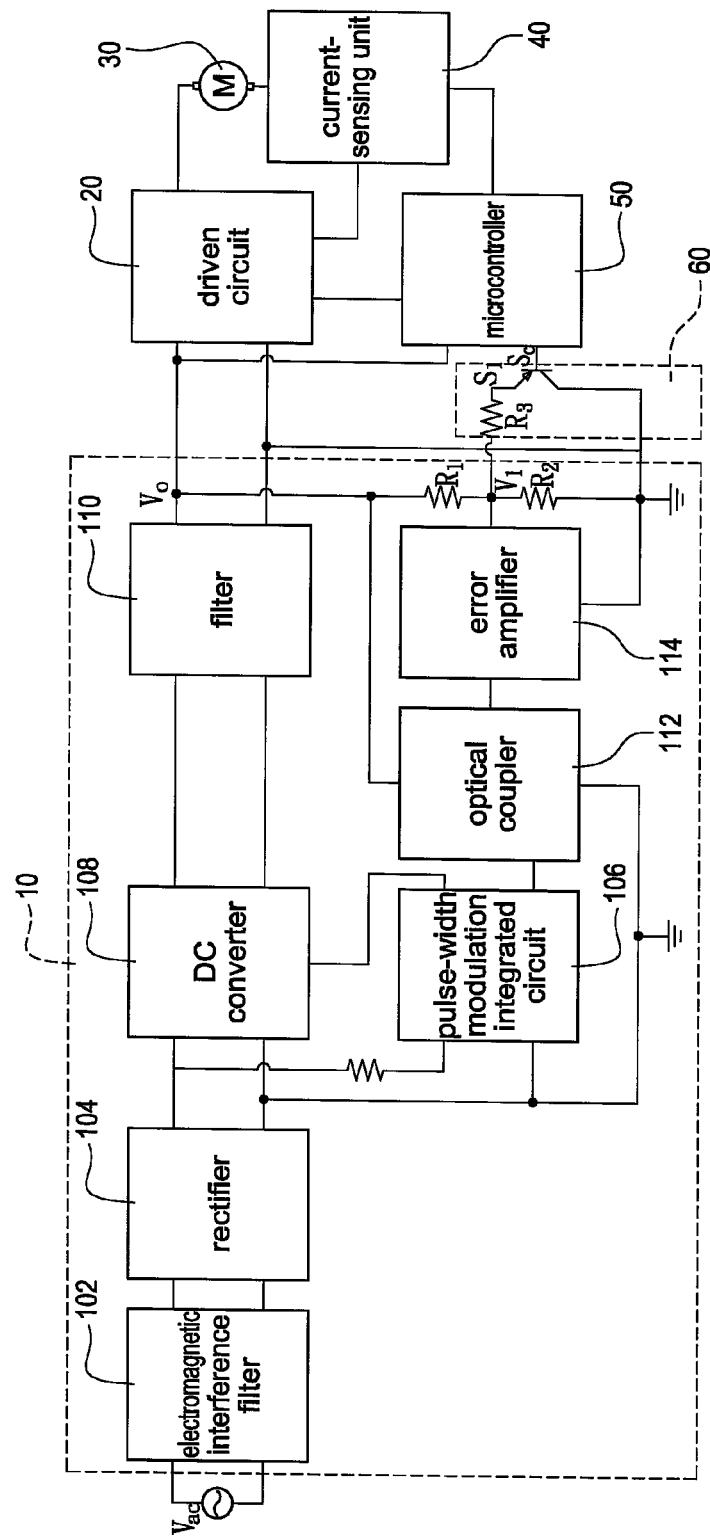
FIG. 3 is a circuit diagram of a ventilation apparatus with a two-section feedback compensation control according to a preferred embodiment of the prevent invention.

Reference is made to FIG. 3 which is a circuit diagram of a ventilation apparatus with a two-section feedback compensation control according to a preferred embodiment of the prevent invention. The ventilation apparatus includes a power conversion unit 10, a driven circuit 20, a DC motor 30, a current-sensing unit 40, a control unit 50, and a voltage compensation unit 60.

The power conversion unit 10 receives an AC power voltage Vac and converts the AC power voltage Vac into a DC power voltage Vo. The power conversion unit 10 includes an electromagnetic interference filter 102, a rectifier 104, a pulse-width modulation integrated circuit (PWM IC) 106, a DC converter 108, a filter 110, an optical coupler 112, and an error amplifier 114.

The electromagnetic interference filter 102 receives the AC power voltage Vac to eliminate noise of the AC power voltage Vac. The rectifier 104 is electrically connected to the electromagnetic interference filter 102 to rectify the filtered AC power voltage Vac and output a DC output voltage (not shown). The DC converter 108 is electrically connected to the rectifier 104 to receive the DC output voltage and convert energy provided from the AC power voltage Vac to a dc-side load. The filter 110 is electrically connected to the DC converter 108 to filter the DC voltage and produce the DC power voltage Vo. The PWM IC 106 is electrically connected to the rectifier 104 and the DC converter 108 to output a PWM signal and control power switches (not shown) of the DC converter 108, thus providing an energy conversion between an input side and an output side of the power conversion unit 10. The optical coupler 112 is electrically connected to the PWM IC 106 to provide signal isolation between the input side and the output side of the power conversion unit 10. The error amplifier 114 is electrically connected to the optical coupler 112 to receive the DC power voltage Vo. The DC power voltage Vo is divided through the first resistor R1, the second resistor R2, and resistors of the voltage compensation unit 60 (detailed description as follows) to obtain a divided voltage. The divided voltage is compared to a reference voltage V1 to produce an error amplifier signal (not shown) and the error amplifier signal is sent to the PWM IC 106 by the optical coupler 112, thus controlling the DC converter 108.

The driven circuit 20 is electrically connected to the power conversion unit 10 to receive the DC power voltage Vo and output a driven voltage (not shown), thus driving the DC motor 30.

The DC motor 30 is electrically connected to the driven circuit 20 and driven by the driven voltage outputted from the driven circuit 20. In particular, the DC motor 30 is a brushless DC motor, BLDCM. The voltage compensation unit 60 is electrically connected to the power conversion unit 10 to regulate the DC power voltage Vo, thus adjusting speed of the DC motor 30.

The current-sensing unit 40 is electrically connected to driven circuit 20 and the DC motor 30 to sense an output current (not shown) outputted from the DC motor 30. The control unit 50 is electrically connected to the current-sensing unit 40, the driven circuit 20, and the voltage compensation unit 60 to receive the output current and produce a threshold current value (not shown) comparing to the output current, but not limited. Instead of producing the threshold current value, the control unit 50 alternatively produces a threshold voltage value. In addition, the output current can be converted as an output voltage comparing to the threshold voltage value. If the output current is smaller than the threshold current value, the control unit 50 produces a DC control signal Sc to control the voltage compensation unit 60 regulating the DC power voltage Vo, thus adjusting speed of the DC motor 30 through the driven circuit 20. Hence, the DC motor 30 can be operated under different DC power voltage Vo to meet requests of power consumption and air flow.

Figure 4:
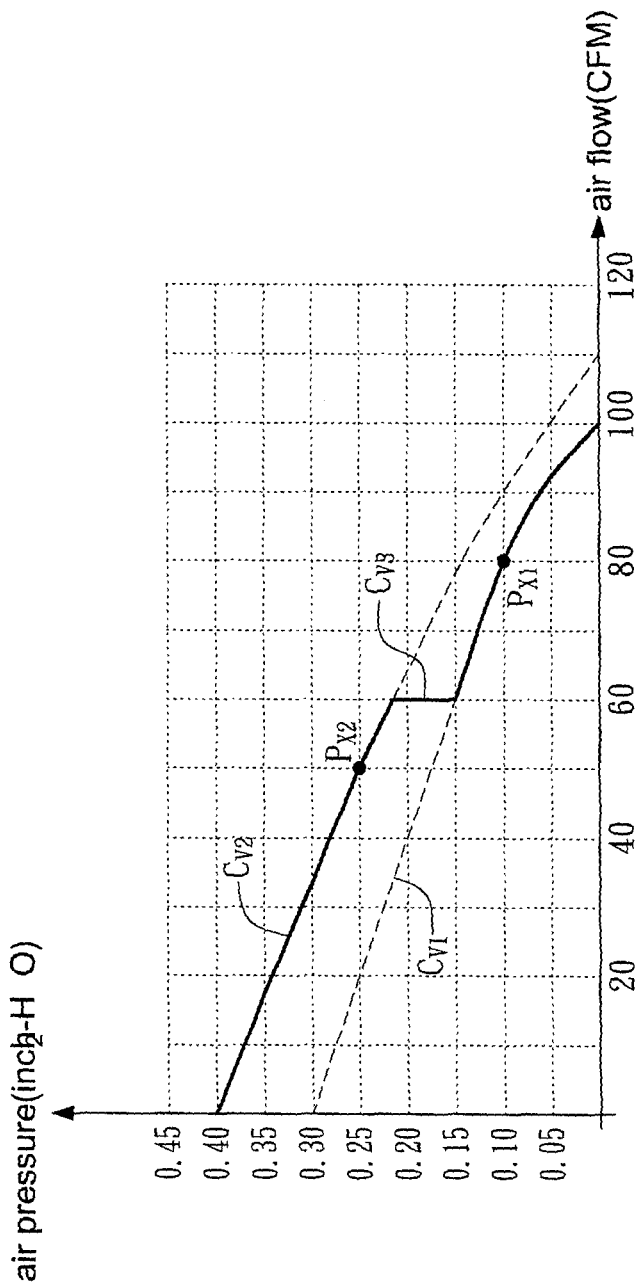
FIG. 4 is a curve chart of air pressure and air flow of the ventilation apparatus with a feedback compensation control according to the prevent invention.

The detailed operation of the ventilation apparatus with the two-section feedback compensation control is described as follows. In this embodiment, the voltage compensation unit 60 has a third resistor R3 and a first switch S1. Reference is made to FIG. 4 which is a curve chart of air pressure and air flow of the ventilation apparatus with a feedback compensation control according to the prevent invention. FIG. 4 shows a first curve Cv1 (low-pressure and low-speed curve) and a second curve Cv2 (high-pressure and high-speed curve). The current-sensing unit 40 senses the output current outputted from the DC motor 30 and the output current is used to compare to the threshold current value, which is produced by the control unit 50, by the voltage compensation unit 60. Alternatively, the output current can be converted as an output voltage comparing to a threshold voltage value. In particular, the control unit 50 can be a microcontroller (MCU).

If the output current is smaller than the threshold current value, the control unit 50 produces the DC control signal Sc to turn on the first switch S1. Hence, the third resistor R3 is loaded so that the third resistor R3 is electrically connected in parallel to the second resistor R2. Based on an equivalent resistance due to introduction of the third resistor R3, the DC power voltage Vo is regulated (is increased in this embodiment), thus increasing speed of the DC motor 30.

Accordingly, the DC power voltage Vo is:

$$Vo = \frac{R1 + (R2 // R3)}{R2 // R3} \times V1$$

The ventilation apparatus is originally operated along the first curve Cv1. After the ventilation apparatus is operated at a first switch operation point Px1, the control unit 50 produces the DC control signal Sc to turn on the first switch S1 and introduce the third resistor R3, thus increasing the DC power voltage Vo and speed of the DC motor 30. Afterward, the operation of the ventilation apparatus is changed to along the second curve Cv2 due to increasing speed of the DC motor 30 before the ventilation apparatus is operated at a second switch operation point Px2. That is, the ventilation apparatus is controlled to be operated along the first curve Cv1 after reaching the first switch operation point Px1 and along the second curve Cv2 before reaching the second switch operation point Px2. The above-mentioned operation path of the ventilation apparatus is shown as a third curve Cv3, but not limited. In particular, the first switch operation point Px1 and the second switch operation point Px2 can be predetermined. The output current outputted from the DC motor 30 is compared to the threshold current value produced by the control unit 50 to produce the DC control signal Sc, thus regulating the DC power voltage Vo by controlling the voltage compensation unit 60 and adjusting speed of the DC motor 30 by the driven circuit 20. Accordingly, the requests of air pressure and air flow with regard to Energy Star for the ventilation apparatus can be met.

Figure 5A:
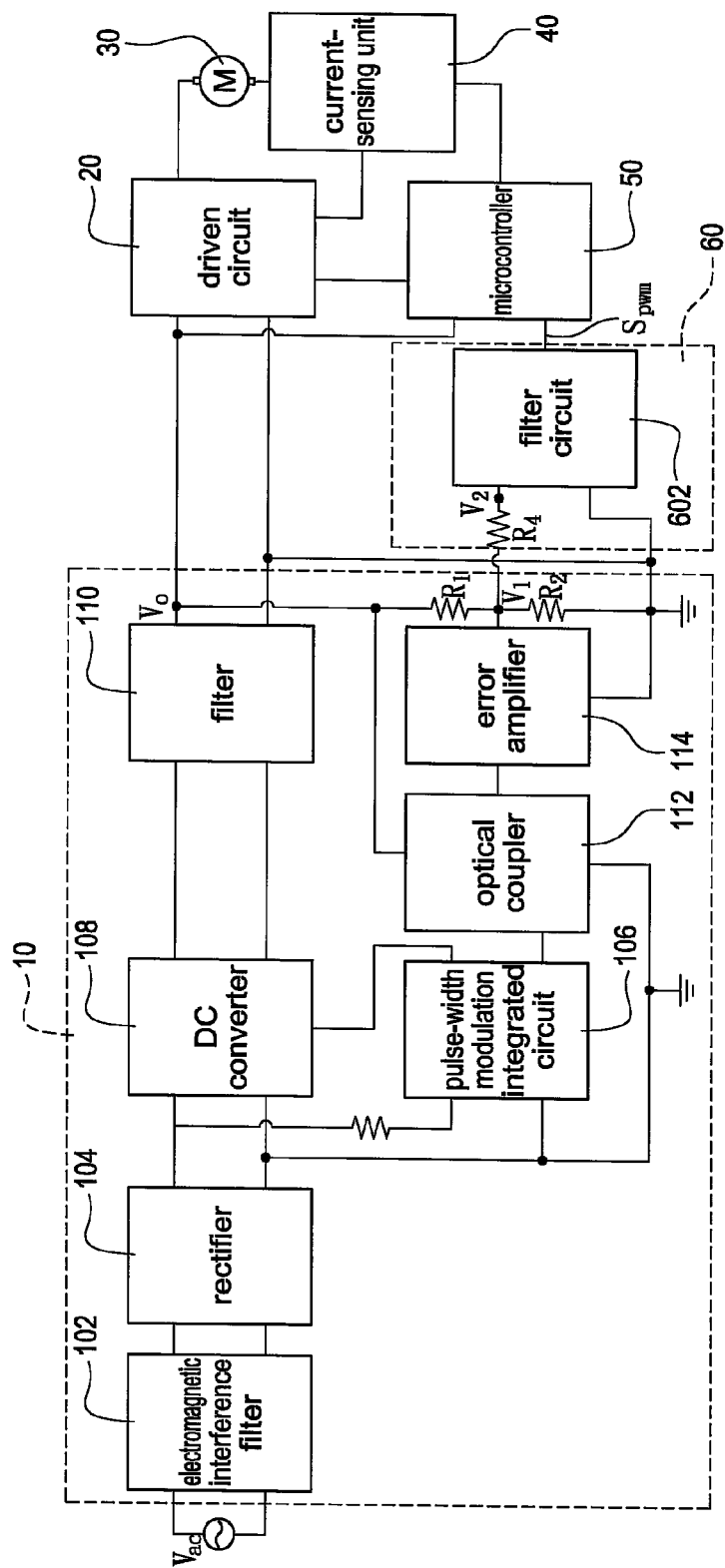
FIG. 5A is a circuit diagram of a ventilation apparatus with a multi-section feedback compensation control according to a first embodiment of the prevent invention.
Figure 5B:
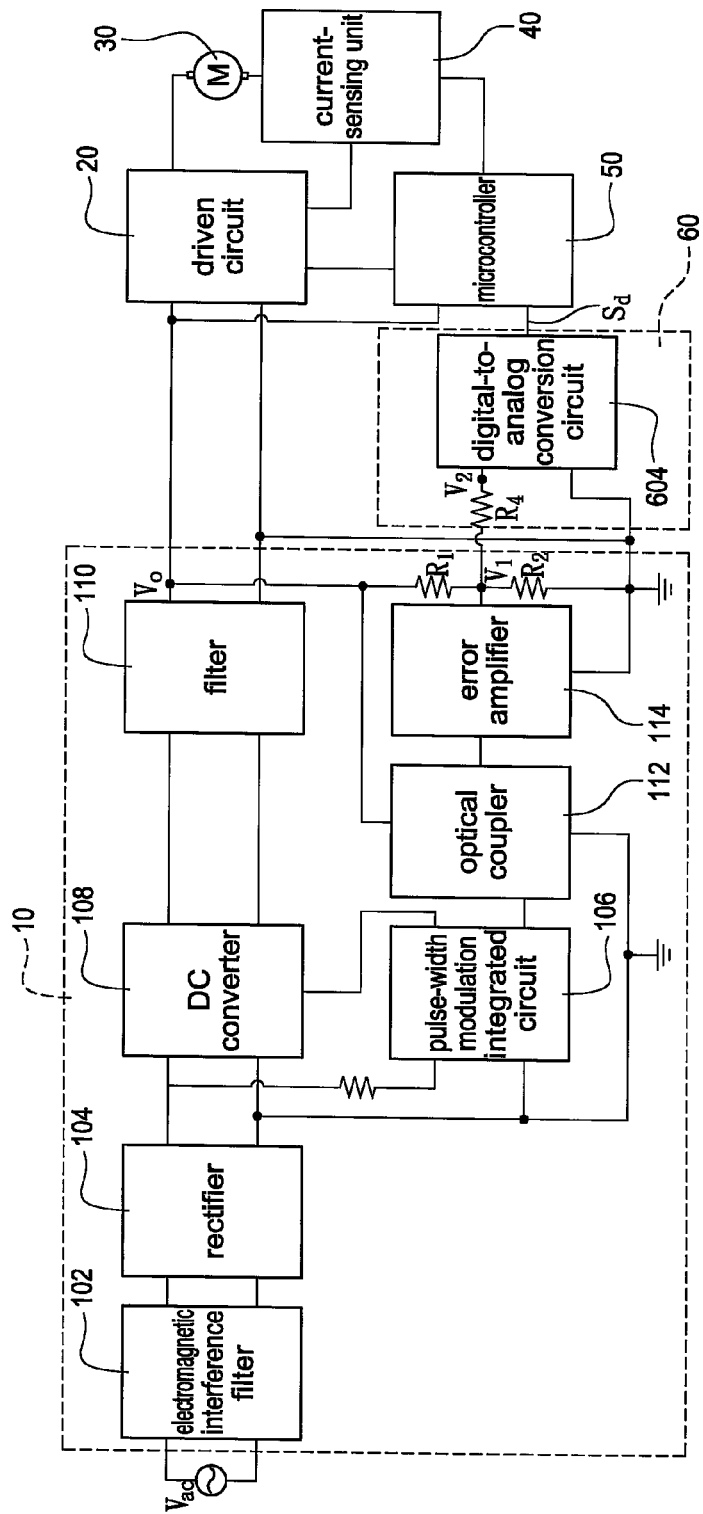
FIG. 5B is a circuit diagram of a ventilation apparatus with a multi-section feedback compensation control according to a second embodiment of the prevent invention.

Reference is made to FIG. 5A and FIG. 5B which are circuit diagrams of the ventilation apparatus with a multi-section feedback compensation control according to a first embodiment and a second embodiment of the prevent invention. The major difference between this embodiment and the above-mentioned embodiment is that the former is a two-section feedback compensation control. The ventilation apparatus includes a power conversion unit 10, a driven circuit 20, a DC motor 30, a current-sensing unit 40, a control unit 50, and a voltage compensation unit 60.

The power conversion unit 10 receives an AC power voltage Vac and converts the AC power voltage Vac into a DC power voltage Vo. The power conversion unit 10 includes an electromagnetic interference filter 102, a rectifier 104, a pulse-width modulation integrated circuit (PWM IC) 106, a DC converter 108, a filter 110, an optical coupler 112, and an error amplifier 114.

The electromagnetic interference filter 102 receives the AC power voltage Vac to eliminate noise of the AC power voltage Vac. The rectifier 104 is electrically connected to the electromagnetic interference filter 102 to rectify the filtered AC power voltage Vac and output a DC output voltage (not shown). The DC converter 108 is electrically connected to the rectifier 104 to receive the DC output voltage and convert energy provided from the AC power voltage Vac to a dc-side load. The filter 110 is electrically connected to the DC converter 108 to filter the DC voltage and produce the DC power voltage Vo. The PWM IC 106 is electrically connected to the rectifier 104 and the DC converter 108 to output a PWM signal and control power switches (not shown) of the DC converter 108, thus providing an energy conversion between an input side and an output side of the power conversion unit 10. The optical coupler 112 is electrically connected to the PWM IC 106 to provide signal isolation between the input side and the output side of the power conversion unit 10. The error amplifier 114 is electrically connected to the optical coupler 112 to receive the DC power voltage Vo. The DC power voltage Vo is divided through the first resistor R1, the second resistor R2, and resistors of the voltage compensation unit 60 (detailed description as follows) to obtain a divided voltage. The divided voltage is compared to a reference voltage V1 to produce an error amplifier signal (not shown) and the error amplifier signal is sent to the PWM IC 106, thus controlling the DC converter 108.

The driven circuit 20 is electrically connected to the power conversion unit 10 to receive the DC power voltage Vo and output a driven voltage (not shown), thus driving the DC motor 30.

The DC motor 30 is electrically connected to the driven circuit 20 and driven by the driven voltage outputted from the driven circuit 20. In particular, the DC motor 30 is a brushless DC motor, BLDCM. The voltage compensation unit 60 is electrically connected to the power conversion unit 10 to regulate the DC power voltage Vo, thus adjusting speed of the DC motor 30.

The current-sensing unit 40 is electrically connected to driven circuit 20 and the DC motor 30 to sense an output current (not shown) outputted from the DC motor 30. The control unit 50 is electrically connected to the current-sensing unit 40, the driven circuit 20, and the voltage compensation unit 60 to receive the output current and produce a plurality of threshold current values (not shown) comparing to the output current, but not limited. Instead of producing the threshold current values, the control unit 50 also produces a plurality of threshold voltage values. In addition, the output current can be converted as an output voltage comparing to the threshold voltage values. The control unit 50 produces a pulse-width modulation control signal Spwm (as shown in FIG. 5A) or a digital control signal Sd (as shown in FIG. 5B) to control the voltage compensation unit 60 regulating the DC power voltage Vo, thus adjusting speed of the DC motor 30 through the driven circuit 20 according to each threshold current value comparing to the output current. Accordingly, the DC motor 30 can be operated under different DC power voltage Vo to meet requests of power consumption and air flow.

The detailed operation of the ventilation apparatus with the multi-section feedback compensation control is described as follows. In the first embodiment (as shown in FIG. 5A), the voltage compensation unit 60 has a fourth resistor R4 and a filter circuit 602. In the second embodiment (as shown in FIG. 5B), the voltage compensation unit 60 has a fourth resistor R4 and a digital-to-analog conversion circuit 604. The current-sensing unit 40 senses the output current outputted from the DC motor 30 and the output current is used to compare to the threshold current value, which is produced by the control unit 50, by the voltage compensation unit 60. Alternatively, the output current can be converted as an output voltage comparing to a threshold voltage value. In particular, the control unit 50 can be a microcontroller (MCU).

With regard to the first embodiment, the filter circuit 602 filters the PWM control signal Spwm and produces a compensation voltage V2 when the control unit 50 produces the PWM control signal Spwm. In particular, a voltage level of the compensation voltage V2 can be adjusted by controlling a duty cycle of the PWM control signal Spwm by the control unit 50. Hence, a new equivalent resistance is formed due to in-parallel connection of the fourth resistor R4 and the second resistor R2 to regulate (to increase in this embodiment) the DC power voltage Vo, thus increasing speed of the DC motor 30.

Accordingly, the DC power voltage Vo is:

$$Vo = \frac{R1R2 + R2R4 + R4R1}{R2R4} \times V1 - \frac{R1}{R4} \times V2$$

With regard to the second embodiment, the digital-to-analog conversion circuit 604 provides a digital-to-analog operation to the digital control signal Sd and produces a compensation voltage V2 when the control unit 50 produces the digital control signal Sd. In particular, a voltage level of the compensation voltage V2 can be adjusted by controlling bit values of the digital control signal Sd by the control unit 50. Hence, a new equivalent resistance is formed due to in-parallel connection of the fourth resistor R4 and the second resistor R2 to regulate (to increase in this embodiment) the DC power voltage Vo, thus increasing speed of the DC motor 30.

Accordingly, the DC power voltage Vo is:

$$Vo = \frac{R1R2 + R2R4 + R4R1}{R2R4} \times V1 - \frac{R1}{R4} \times V2$$

Accordingly, the ventilation apparatus can provide a multi-section feedback compensation control as the two above-mentioned embodiments. That is, the multi-section feedback compensation control can be implemented by controlling the duty cycle of the PWM control signal Spwm or controlling bit values of the digital control signal Sd according to different requests of air pressure and air flow. Especially to deserve to be mentioned, different switch operation points are predetermined to achieve the multi-section feedback compensation control. However, only two switch operation points need to be predetermined for the two-section feedback compensation control. After predetermining the switch operation points, the output current outputted from the DC motor 30 is sensed by the current-sensing unit 40 to compare to the threshold current values produced by the control unit 50, thus producing the PWM control signal Spwm or the digital control signal Sd. The PWM control signal Spwm or the digital control signal Sd are received by the filter circuit 602 or the digital-to-analog conversion circuit 604, respectively, to output the compensation voltage V2, thus introducing the fourth resistor R4 to form the new equivalent resistance. Hence, the DC power voltage Vo is regulated to adjust speed of the DC motor 30 by the driven circuit 20. Accordingly, the requests of air pressure and air flow with regard to Energy Star for the ventilation apparatus can be met.

Figure 6:
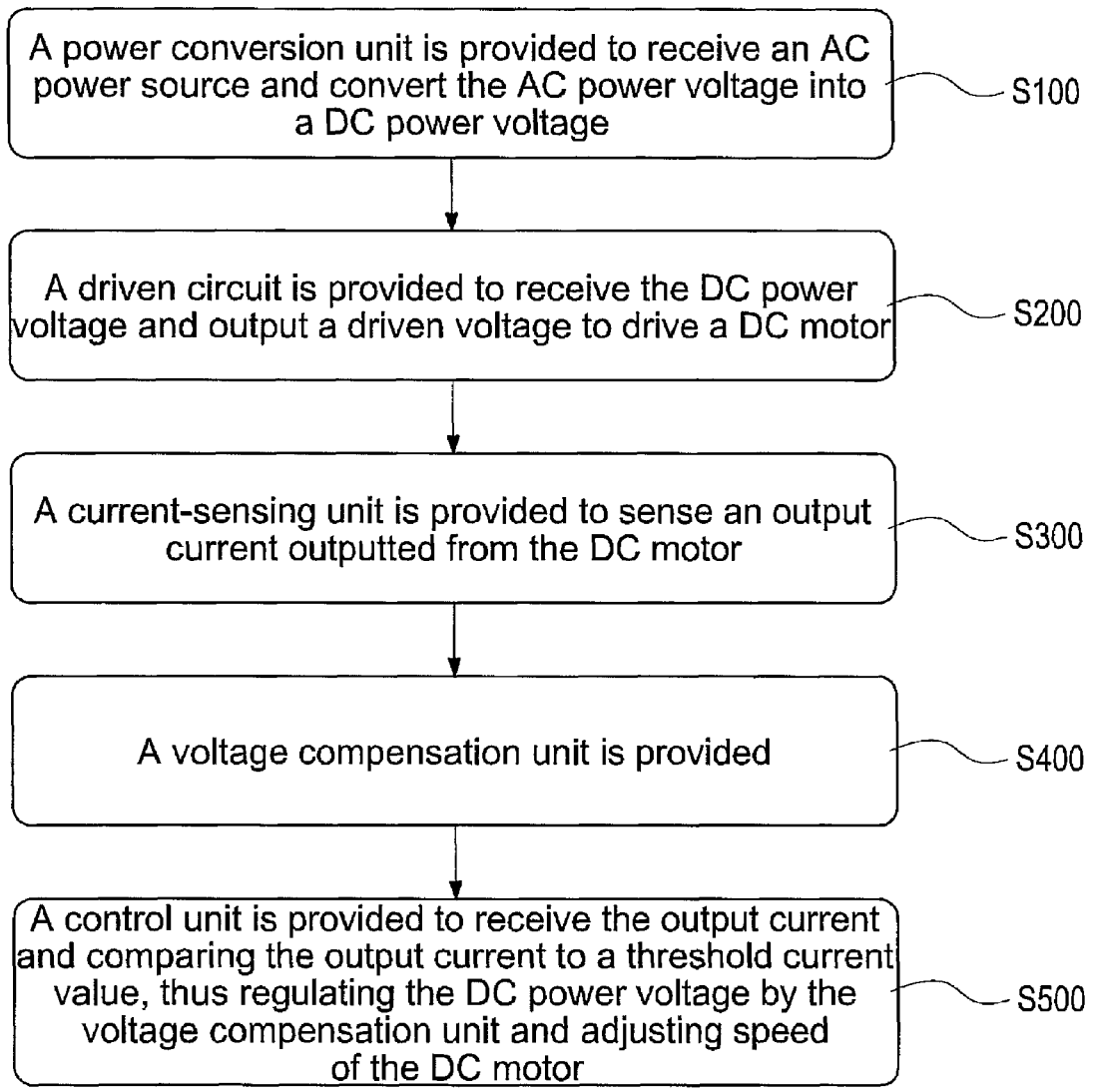
FIG. 6 is a flowchart of a method for operating a ventilation apparatus with feedback compensation control according to the present invention.

Reference is made to FIG. 6 which is a flowchart of a method for operating a ventilation apparatus with feedback compensation control according to the present invention. The method is provided to operate a ventilation apparatus with a two-section or a multi-section feedback compensation control. The method includes following steps: First, a power conversion unit is provided to receive an AC power source and convert the AC power voltage into a DC power voltage (S100). In particular, the DC motor is a brushless DC motor, BLDCM. Afterward, a driven circuit is provided to receive the DC power voltage and output a driven voltage to drive a DC motor (S200). Afterward, a current-sensing unit is provided to sense an output current outputted from the DC motor (S300). Afterward, a voltage compensation unit is provided (S400). In particular, the voltage compensation unit has a resistor and a switch component. In addition, the voltage compensation unit has a resistor and a filter circuit or has a resistor and a digital-to-analog conversion circuit in different embodiments. Finally, a control unit is provided to receive the output current and comparing the output current to a threshold current value, thus regulating the DC power voltage by the voltage compensation unit and adjusting speed of the DC motor (S500). In particular, the control unit 50 can be a microcontroller (MCU).

With regard to the voltage compensation unit having the resistor and the switch component is discussed as follows. In step S500, the control unit produces a threshold current value to compare to the output current if the output current is smaller than the threshold current value. Hence, the control unit produces a DC control signal to turn on the switch component to introduce the resistor, thus regulating the DC power voltage by controlling the voltage compensation unit and adjusting speed of the DC motor by the driven circuit. Accordingly, the two-section feedback compensation control is implemented to meet requests of power consumption and air flow when the DC motor is operated under different DC power voltage.

Furthermore, with regard to the voltage compensation unit having the resistor and the filter circuit is discussed as follows. In step S500, the control unit produces a plurality of threshold current values to compare to the output current. Also, the control unit produces a PWM control signal according to each threshold current value comparing to the output current, thus controlling the voltage compensation unit to regulate the DC power voltage and adjusting speed of the DC motor by the driven circuit. Accordingly, the multi-section feedback compensation control is implemented to meet requests of power consumption and air flow when the DC motor is operated under different DC power voltage.

Furthermore, with regard to the voltage compensation unit having the resistor and the digital-to-analog conversion circuit is discussed as follows. In step S500, the control unit produces a plurality of threshold current values to compare to the output current. Also, the control unit produces a digital control signal according to each threshold current value comparing to the output current, thus controlling the voltage compensation unit to regulate the DC power voltage and adjusting speed of the DC motor by the driven circuit. Accordingly, the multi-section feedback compensation control is implemented to meet requests of power consumption and air flow when the DC motor is operated under different DC power voltage.

In conclusion, the present invention has following advantages:
1. The ventilation apparatus, such as an air interchanging fan, can be operated at rated speed and air flow to consume minimum energy and achieve maximum efficiency;
2. The feedback compensation control is provided to prevent the ventilation apparatus from reduction of speed because of the increasing wire resistance coil temperature accompanied by the increasing coil temperature of the DC motor;
3. More air flow can be obtained based on the feedback compensation control than that based on a non-feedback compensation control; and
4. The feedback compensation control is used to regulate one or more feedback starting voltage to implement the two-section or multi-section feedback compensation control.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A ventilation apparatus with a two-section feedback compensation control; the ventilation apparatus comprising:
a power conversion unit receiving an AC power voltage and converting the AC power voltage into a DC power voltage;
a driven circuit electrically connected to the power conversion unit to receive the DC power voltage and output a driven voltage;
a DC motor electrically connected to the driven circuit and driven by the driven voltage outputted from the driven circuit;
a current-sensing unit electrically connected to the DC motor and the driven circuit to sense an output current outputted from the DC motor;
a voltage compensation unit electrically connected to the power conversion unit; and
a control unit electrically connected to the current-sensing unit, the driven circuit, and the voltage compensation unit to receive the output current and produce a threshold current value comparing to the output current;
wherein the control unit is configured to produce a DC control signal to control the voltage compensation unit regulating the DC power voltage, thus adjusting speed of the DC motor through the driven circuit when the output current is smaller than the threshold current value.

2. The ventilation apparatus of claim 1, wherein the voltage compensation unit has a resistor and a switch component.

3. The ventilation apparatus of claim 2, wherein the control unit is configured to turn on the switch component through the DC control signal to load the resistor to the DC power voltage, thus regulating the DC power voltage and adjusting speed of the DC motor through the driven circuit.

4. The ventilation apparatus of claim 1, wherein the control unit is a microcontroller.

5. The ventilation apparatus of claim 1, wherein the DC motor is a brushless DC motor.

6. A ventilation apparatus with a multi-section feedback compensation control; the ventilation apparatus comprising:
a power conversion unit receiving an AC power voltage and converting the AC power voltage into a DC power voltage;
a driven circuit electrically connected to the power conversion unit to receive the DC power voltage and output a driven voltage;
a DC motor electrically connected to the driven circuit and driven by the driven voltage outputted from the driven circuit;

a current-sensing unit electrically connected to the DC motor and the driven circuit to sense an output current outputted from the DC motor;
a voltage compensation unit electrically connected to the power conversion unit; and
a control unit electrically connected to the current-sensing unit, the driven circuit, and the voltage compensation unit to receive the output current and produce a plurality of threshold current values comparing to the output current;
wherein the control unit is configured to produce a pulse-width modulation control signal or a digital control signal to control the voltage compensation unit regulating the DC power voltage, thus adjusting speed of the DC motor through the driven circuit according to each threshold current value comparing to the output current.

7. The ventilation apparatus of claim 6, wherein the voltage compensation unit has a resistor and a filter circuit, and the filter circuit provides a filter operation to the pulse-width modulation control signal when the control unit produces the pulse-width modulation control signal.

8. The ventilation apparatus of claim 6, wherein the voltage compensation unit has a resistor and a digital-to-analog conversion circuit, and the digital-to-analog conversion circuit provides a digital-to-analog conversion operation to the digital control signal when the control unit produces the digital control signal.

9. The ventilation apparatus of claim 6, wherein the control unit is configured to control the voltage compensation unit regulating the DC power voltage and adjusting speed of the DC motor through the driven circuit by controlling a duty cycle of the pulse-width modulation control signal or controlling bit values of the digital control signal.

10. The ventilation apparatus of claim 6, wherein the control unit is a microcontroller.

11. The ventilation apparatus of claim 6, wherein the DC motor is a brushless DC motor.

12. A method for operating a ventilation apparatus with a two-section or a multi-section feedback compensation control; steps of operating the ventilation apparatus comprising:
(a) providing a power conversion unit for receiving an AC power voltage and converting the AC power voltage into a DC power voltage;
(b) providing a driven circuit for receiving the DC power voltage and outputting a driven voltage to drive a DC motor;
(c) providing a current-sensing unit for sensing an output current outputted from the DC motor;
(d) providing a voltage compensation unit; and
(e) providing a control unit for receiving the output current and comparing the output current to a threshold current value, thus regulating the DC power voltage by controlling the voltage compensation unit and adjusting speed of the DC motor by the driven circuit.

13. The method for operating the ventilation apparatus of claim 12, in the step (e), the control unit produces a DC control signal to control the voltage compensation unit regulating the DC power voltage, thus adjusting speed of the DC motor through the driven circuit when the output current is smaller than the threshold current value.

14. The method for operating the ventilation apparatus of claim 12, in the step (e), the control unit produces a pulse-width modulation control signal or a digital control signal to control the voltage compensation unit regulating the DC power voltage, thus adjusting speed of the DC motor through the driven circuit according to each threshold current value comparing to the output current.

15. The method for operating the ventilation apparatus of claim 13, wherein the voltage compensation unit has a resistor and a switch component; and the control unit loads the resistor by turning on the switch component through the DC control signal, thus regulating the DC power voltage and adjusting speed of the DC motor through the driven circuit.

16. The method for operating the ventilation apparatus of claim 14, wherein the voltage compensation unit has a resistor and a filter circuit; the filter circuit provides a filter operation to the pulse-width modulation control signal when the control unit produces the pulse-width modulation control signal.

17. The method for operating the ventilation apparatus of claim 14, wherein the voltage compensation unit has a resistor and a digital-to-analog conversion circuit; the digital-to-analog conversion circuit provides a digital-to-analog conversion operation to the digital control signal when the control unit produces the digital control signal.

18. The method for operating the ventilation apparatus of claim 14, wherein the control unit controls the voltage compensation unit regulating the DC power voltage and adjusting speed of the DC motor through the driven circuit by controlling a duty cycle of the pulse-width modulation control signal or controlling bit values of the digital control signal.

19. The method for operating the ventilation apparatus of claim 12, wherein the control unit is a microcontroller.

20. The method for operating the ventilation apparatus of claim 12, wherein the DC motor is a brushless DC motor.

* * * * *